(12) United States Patent
Yau et al.

(10) Patent No.: US 11,189,087 B2
(45) Date of Patent: Nov. 30, 2021

(54) METHOD FOR GENERATING A 3D DIGITAL MODEL, USED IN HAIRPIECE MANUFACTURING

(71) Applicant: TRUE HAIR LLC, Somerville, MA (US)

(72) Inventors: Shing-Tung Yau, Somerville, MA (US); Eugene M. Yau, Somerville, MA (US); Dale Owen Royer, Somerville, MA (US)

(73) Assignee: TRUE HAIR LLC, Somerville, MA (US)

( * ) Notice: Subject to any disclaimer, the term of this patent is extended or adjusted under 35 U.S.C. 154(b) by 26 days.

(21) Appl. No.: 16/639,531

(22) PCT Filed: Aug. 13, 2018

(86) PCT No.: PCT/US2018/046435
§ 371 (c)(1),
(2) Date: Feb. 14, 2020

(87) PCT Pub. No.: WO2019/036330
PCT Pub. Date: Feb. 21, 2019

(65) Prior Publication Data
US 2021/0174576 A1 Jun. 10, 2021

Related U.S. Application Data

(60) Provisional application No. 62/545,768, filed on Aug. 15, 2017.

(51) Int. Cl.
*G06T 17/00* (2006.01)
*G01B 11/25* (2006.01)
(Continued)

(52) U.S. Cl.
CPC ............ *G06T 17/00* (2013.01); *A45D 44/005* (2013.01); *G01B 11/25* (2013.01); *H04N 13/239* (2018.05)

(58) Field of Classification Search
None
See application file for complete search history.

(56) References Cited

U.S. PATENT DOCUMENTS 5,060,677 A * 10/1991 Duffel ................. A41G 3/0075
132/53
2011/0052043 A1 * 3/2011 Hyung ................ G05D 1/0242
382/154
(Continued)

OTHER PUBLICATIONS

International Search Report and Written Opinion issued in corresponding International Application No. PCT/US2018/046435 dated Oct. 29, 2018, U.S. Patent and Trademark Office, Alexandria, VA.

*Primary Examiner* — Saptarshi Mazumder
(74) *Attorney, Agent, or Firm* — Hauptman Ham, LLP

(57) ABSTRACT

A method for generating a 3D digital model used in hairpiece manufacturing is disclosed, which comprises: scanning a subject's head three-dimensionally by optical means, and obtaining 3D geometry and color information of the head, the 3D geometry and the color information having a positional correspondence therebetween; generating a 3D model of the head based on the 3D geometry and color information; identifying a target area to be covered by a hairpiece based on the color information; and obtaining position of the target area based on the positional correspondence between the 3D geometry and the color information. A system for generating a 3D digital model used in hairpiece manufacturing is also disclosed, which comprises a 3D optical scanner and an electronic device.

22 Claims, 3 Drawing Sheets

(51) Int. Cl.
*A45D 44/00* (2006.01)
*H04N 13/239* (2018.01)

(56) References Cited

U.S. PATENT DOCUMENTS

| | | | |
|---|---|---|---|
| 2015/0070466 A1* | 3/2015 | Leung | H04N 5/2257 |
| | | | 348/46 |
| 2015/0248719 A1* | 9/2015 | Hansen | G06Q 50/01 |
| | | | 705/26.63 |
| 2016/0307032 A1 | 10/2016 | Butler et al. | |
| 2017/0000570 A1* | 1/2017 | Zhang | A61B 5/0077 |

* cited by examiner

METHOD FOR GENERATING A 3D DIGITAL MODEL, USED IN HAIRPIECE MANUFACTURING

This disclosure relates to custom manufacturing of hairpieces. In particular, this disclosure relates to a method and a system for generating a 3D digital model used in hairpiece manufacturing.

BACKGROUND

Many individuals lose naturally growing hair due to, for example, diseases or aging, or just by heredity. Hairpieces provide an important way for improving/changing one's appearance. Previously, an area on one's head, large or small, in which hair is lost, was first outlined and measured, and a hairpiece formed on a flat base material was tailored to the size of this area and then attached to the head to cover the area, by means of, for example, gluing or braiding. One problem with this approach is that, the base material of the hairpiece is flat in shape and when it is attached to the head, creases occur and cause the hairpiece not to fit the curved shape of a head shell very well. It may look bad or cause a loose/unstable attachment of the hairpiece to a head.

In consideration of the above, custom made hairpieces have been proposed. For manufacturing a custom made hairpiece, a physical mold of a head is usually produced in accordance to the shape and size of a customer's head at a mold factory, and then shipped to a hairpiece factory, where a hairpiece is custom made by using the physical mold and can be made to fit the mold and thus fit the customer's head well.

For improving the precision and efficiency in producing a physical mold of head, a 3D digital model of a subject's head can be generated first, and then the physical mold can be produced according to the 3D digital model. However, there is still a need for an improved approach for generating a 3D digital head model, which is efficient and convenient.

SUMMARY

Aspects of the present disclosure address some of the problems described above.

According to one aspect of the present disclosure, a method for generating a 3D digital model used in hairpiece manufacturing is provided, which comprises: scanning a subject's head three-dimensionally by optical means, and obtaining 3D geometry and color information of the head, the 3D geometry and the color information having a positional correspondence therebetween; generating a 3D model of the head based on the 3D geometry and color information; identifying a target area to be covered by a hairpiece based on the color information; and obtaining position of the target area based on the positional correspondence between the 3D geometry and the color information.

According to another aspect of the present disclosure, a system for generating a 3D digital model used in hairpiece manufacturing is provided, which comprises: a 3D scanner, for scanning a subject's head and obtaining 3D geometry and color information of the head, the 3D geometry and color information having positional correspondence therebetween; and an electronic device, which receives the 3D geometry and color information and is configured to: generate a 3D model of the head based on the 3D geometry and color information; identify a target area to be covered by a hairpiece on the head based on the color information; and obtain position of the target area on the 3D model based on the positional correspondence between the 3D geometry and the color information.

According to another aspect of the present disclosure, a method for generating a 3D digital model used in hairpiece manufacturing is provided, which comprises: putting on a subject's head an elastic cap, which wraps on and conforms to the head; marking an outline of a target area, which is to be covered by a hairpiece, with visible indication on the elastic cap; scanning the subject's head three-dimensionally by optical means, and obtaining 3D geometry and color information of the head, the 3D geometry and the color information having a positional correspondence therebetween; and generating a 3D digital model of the head based on the 3D geometry and color information.

BRIEF DESCRIPTION OF THE DRAWINGS

Other features, objects, and advantages of the present disclosure will become more apparent from the following detailed description when taken in conjunction with the accompanying drawings, in which:

FIG. 6 and FIG. 7 are pictures illustrating an example of the 3D model of the head shown in FIGS. 3 and 4, wherein FIG. 6 presents only 3D geometry, while FIG. 7 presents the 3D model with color information.

DETAILED DESCRIPTION

The present application will now be described in further detail with reference to the accompanying drawings and examples. It is to be understood that the specific embodiments described herein are for the purpose of explaining the related invention and are not intended to limit the invention. It should also be noted that, for the sake of convenience of description, only parts related to the invention are shown in the accompanying drawings. To be specified, the embodiments in the present application and the features in the embodiments can be combined with each other without conflict.

The expression "exemplary", "example" or various forms thereof are used herein to mean serving as an example, instance or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of a varying scope could have been presented, but have been omitted for purposes of brevity.

The present disclosure provides a method and a system for generating a 3D digital model, based on which model, a physical mold can be generated for manufacturing a custom made hairpiece. For hairpiece manufacturing, not only information about shape and size of a subject's head, but also, among others, information about a target area, which is intended to be covered by a hairpiece, need to be collected. The method and the system of the present disclosure provide an efficient way for collecting such information.

Figure 1:
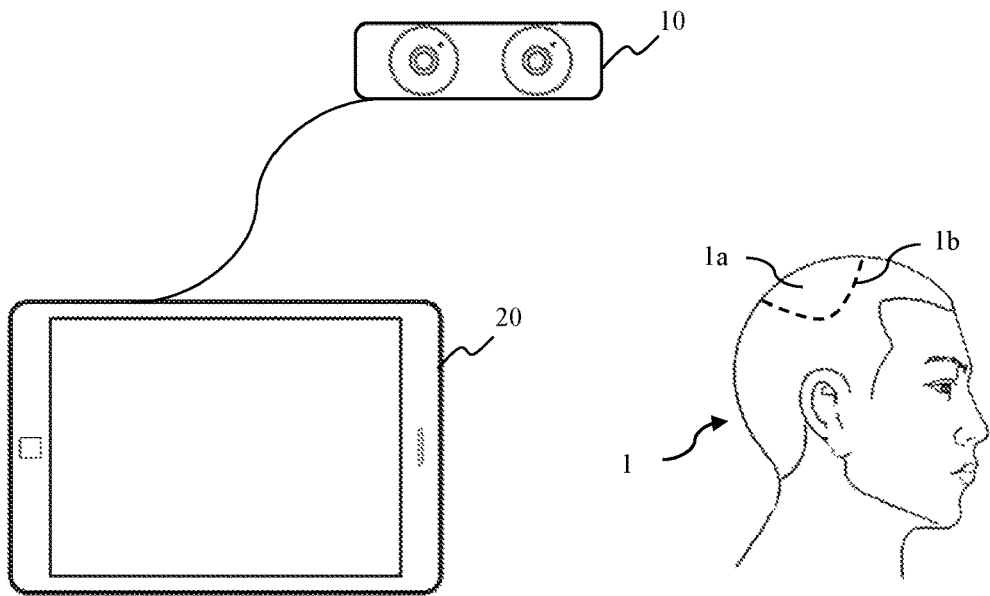
FIG. 1 is a schematic view of an example of a system for generating a 3D digital model used in hairpiece manufacturing of the present disclosure.

FIG. 1 is a schematic view of an example of a system for generating a 3D digital model used in hairpiece manufacturing according to an aspect of the present disclosure. Also, a schematic representation of a subject's head 1, which is to be 3D scanned and modeled with the system of the present disclosure, is included in FIG. 1. Reference numbers "1a" and "1b" refer to a target area and an outline of the target area, respectively. The target area 1a is an area that is intended to be covered by a hairpiece. For example, the target area 1a can be a hair loss area on the head, and in this case, the outline 1b of the target area lies in where the hairline of the hair loss area lies.

As shown in FIG. 1, the system comprises a 3D scanner 10 and an electronic device 20. The 3D scanner 10 is used to scan a subject's head 30 three-dimensionally by optical means, so as to obtain 3D geometry and color information of the head. The 3D geometry and color information obtained by the 3D scanner have positional correspondence between them.

In some embodiments, the 3D scanner 10 comprises binocular camera for obtaining both 3D geometry and color information.

In some other embodiments, the 3D scanner 10 can be configured to use infrared light to obtain 3D geometry and use visible light to obtain color information. In these embodiments, the 3D scanner 10 can comprise for example one camera for detecting infrared light and one camera for detecting visible light, respectively.

For example, the 3D scanner can use infrared light to obtain 3D geometry by means of light coding. Light coding is a depth measurement technology in which laser pattern such as speckles is projected to an object to be measured, and images of the pattern on a surface, onto which the laser pattern is projected, are captured and calculated so as to obtain 3D geometry of the surface. Examples of such a 3D scanner includes, but not limited to, Occipital Structure Sensor available in the market.

As another example, the 3D scanner can use infrared light to obtain 3D geometry by means of ToF (time-of-flight) sensor. With a ToF sensor, infrared light can be projected onto an object to be measured, light reflected on the object is detected by the ToF sensor and time of flight of the reflected light is measured so as to provide depth information of the object, based on which, 3D geometry of the object can be obtained.

A 3D scanner based on infrared light and light coding or ToF can help to reduce calculation needed for obtaining 3D geometry as compared with a scanner based on binocular camera. The former is preferred in consideration of improving efficiency of 3D scan.

The electronic device 20 receives the 3D geometry and color information, and is configured to generate a 3D model of the head based on the 3D geometry and color information.

In some embodiments, the electronic device 20 can be further configured to identify the target area to be covered by a hairpiece on the head based on the color information; and to obtain the position of the target area on the 3D model based on the positional correspondence between the 3D geometry and the color information.

The electronic device 20 may comprise one or more processors and one or more processor readable storage devices, and the one or more processor readable storage devices have encoded thereon instructions for causing the one or more processors to perform the above processing.

In some embodiments, the electronic device 20 may be a portable device such as a tablet computer. Software, for example a custom APP, can be installed in the electronic device 20 to fulfill the above processing.

Figure 2:
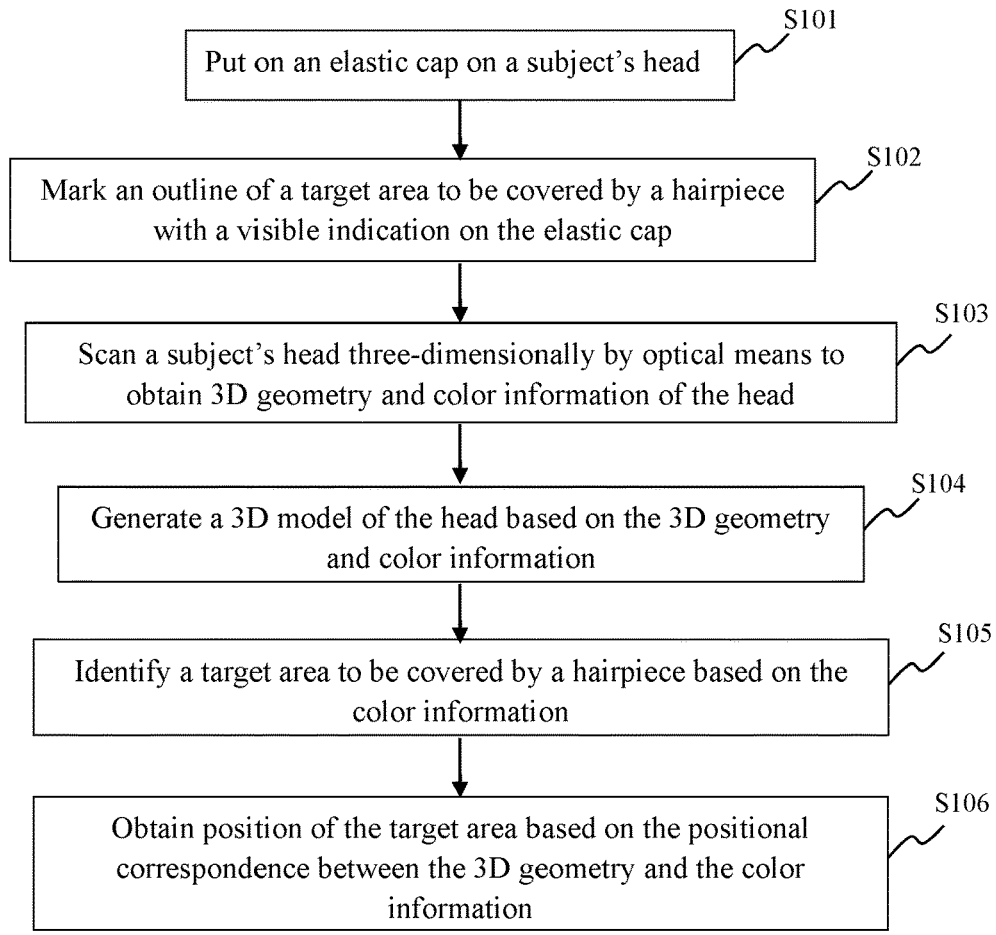
FIG. 2 is a flow chart illustrating an example of a method for generating a 3D digital model used in hairpiece manufacturing according to some embodiments.

FIG. 2 is a flow chart illustrating an example of a method for generating a 3D digital model used in hairpiece manufacturing. FIG. 3 to FIG. 9 are pictures for illustrating different stages of the method in an exemplary way. Hereinafter, detailed description of examples of the method will be made with reference to these figures.

Figure 3:
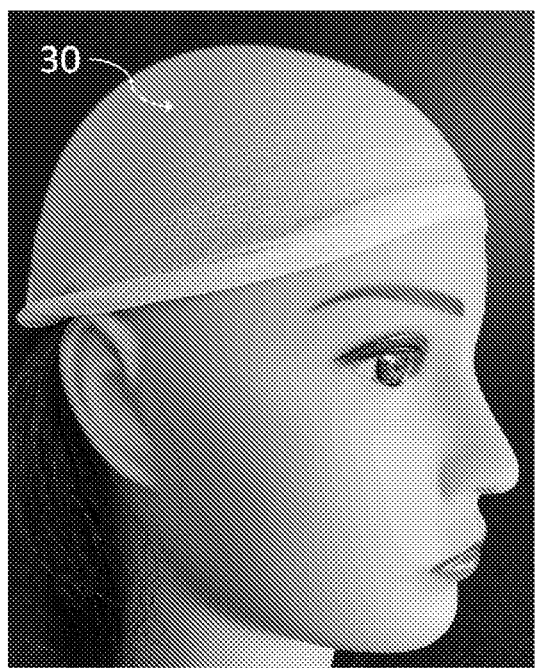
FIG. 3 is a picture showing a head with an elastic cap.
Figure 4:
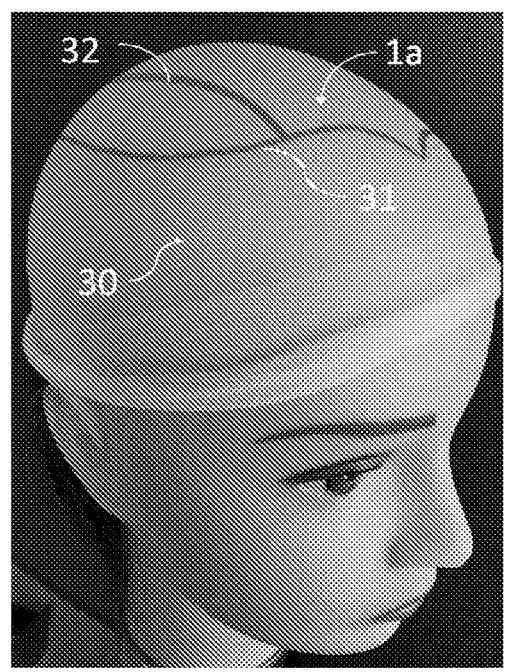
FIG. 4 is a picture showing an example of visible indication marked on the cap of FIG. 3.

As shown in FIG. 2, in step S101, before scanning, an elastic cap is put on a subject's head, wrapping on and conforming to the head. FIG. 3 is a picture showing a head with an elastic cap 30. The elastic cap 30 itself can be a thin fabric material. It stretches over the head tightly, pushing the hair down to the surface of the head. The cap 30 creates a relative clean surface that has no noise (stray hair geometry) when scanning, and thus the geometry of the head can be accurately measured in a clean and precise way.

In some embodiments, the elastic cap 30 can be in white color. The white color reflects light of different wavelengths optimally, as it is color neutral, which means that light of a large range of wavelengths can be reflected well by the white cap and a signal carrying thereon different color information can be obtained through the scanning. As a result, the quality and accuracy of the scan can be improved.

Preferably, the elastic cap 30 is very thin in thickness. As an example, the cap 30 may have a thickness of no more than 0.5 mm; and more preferably, no more than 0.1 mm. Because the material of the cap is so thin, the scanned geometry is a very accurate representation of the surface of the head. The elastic cap 30 can be disposable.

In step S102, an outline of a target area to be covered by a hairpiece is marked on the elastic cap with visible indication. In the example shown in FIG. 4A, a line 31, as visible indication, is drawn on the cap 30 along an outline of a target area (for example, hairline of a hair loss area).

In some embodiments, another line 32, as another visible indication, can be further marked on the cap 30 along a desired hair part line, as shown in FIG. 4B. The visible indication 32 for indicating the hair part line can be in the same color as the visible indication 31 for the outline of the target area, for example green, but can be any other suitable color other than the color of the visible indication 31 for the outline so long as it can provide a contrast good enough for subsequent identification.

The visible indication need to be distinguished from underlying color texture or other boundaries on the scanned surface. The color green is used for visible indication in this example, because it is dark enough to provide a strong contrast with the white cap, and can be identified relatively easily in the digital color image that is captured, so that it can be automatically traced and measured using software algorithms.

However, the present disclosure is not limited to visible indication in green color, and any color may be used that provides good contrast and can be identified easily in contrast to the color of the underlying skin or hair. For example, a florescent color, which is not naturally found could be easily distinguished from the natural underlying head geometry and color, can be used for visible indication marked on the cap. It is to be noted that, here, the color information refers to chromaticity information and/or brightness information. This means, a visible indication can be used in the method of the present disclosure even when it differs only in brightness/grey level from its background.

After the above preparation, in step S103, the head is 3D scanned by optical means, to obtain 3D geometry and color information of the head.

The 3D geometry and color information have positional correspondence therebetween. That is, there exists a mapping that for each position/point on the surface of the 3D model, there is a corresponding color value. Color values are generally stored as 2D digital images and the 3D geometry is generally stored as UV coordinates associated with the vertices of a 3D mesh. The UV coordinates together with the 2D digital images comprise one representation of the mapping. This mapping allows that for each color value at a position in a 2D digital image, a 3D point on the surface of the 3D geometry can be identified. However, this type of mapping is only one example and any mapping that associates 3D surface data with color information can be used.

The 3D scan can be carried out with 3D scanner 10 as discussed above with regard to the system of the present disclosure.

In some embodiments where the electronic device 20 is a portable device, the 3D scanner 10 can be attached to the electronic device 20, and 3D scanning can be carried out by holding the electronic device 20 with the 3D scanner 10 pointing at the subject's head 30 and moving the device 20 slowly a complete 360 degree circle around the head. However, it will be understood that it is not always necessary to make a complete 360 circle around the object. If the designated/interested area is small, like on the top of the head, this scan can be completed by simply standing in one spot and the operator moving the camera around.

Figure 5:
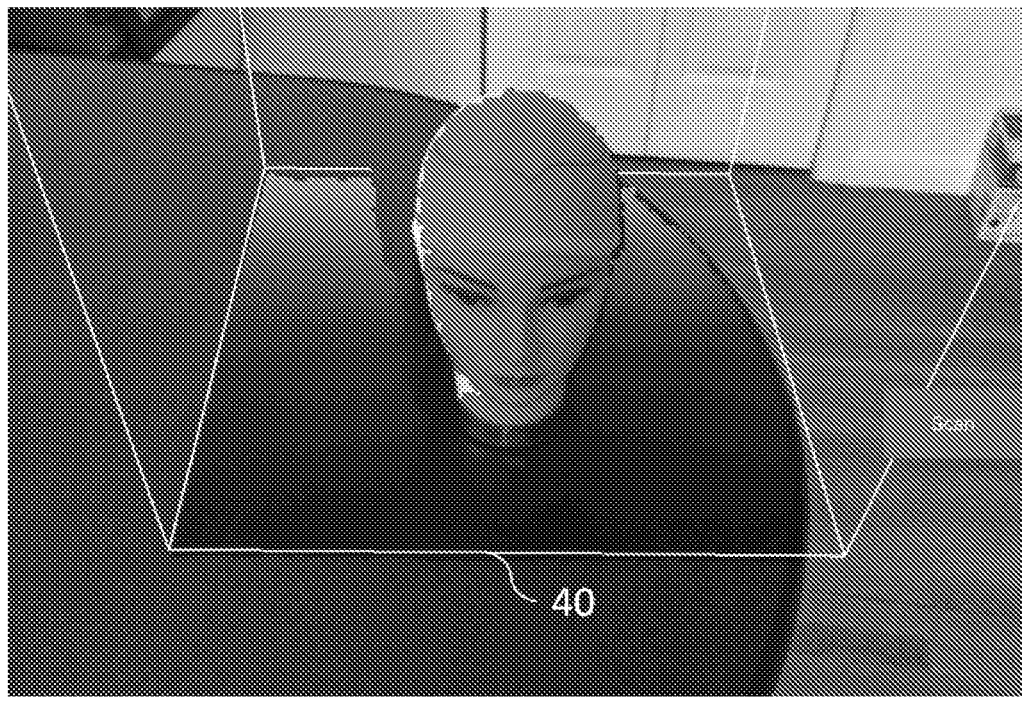
FIG. 5 is a picture showing an example of a user interface for 3D scanning.

FIG. 5 is a picture showing an example of a user interface for 3D scanning. This user interface can be presented on a screen of the electronic device 20. As shown in FIG. 5, a capture volume bounding box (wireframe) 40 is displayed on the screen, indicating an area within which an object can be effectively scanned. Position and/or posture of the 3D scanner can be adjusted so as to make the head centered in the box. Buttons can be provided on the interface for user to control the scan process.

In some embodiments, geometry of the subject's head is captured by one camera of the 3D scanner using infrared light, and a live 2D color view containing color information is obtained by another camera of the 3D scanner using visible light during the scan process. The captured geometry and the 2D color view are sent to the electronic device 20.

Missing geometry or holes can be filled by moving the 3D scanner/electronic device to different angles so as to capture the missing parts.

Then, in step S104, a 3D model of the head is generated based on the 3D geometry and the color information. In some embodiments, the electronic device 20 can superimpose the captured geometry on the 2D color view, and create digitally a 3D model of the head in real-time. Key frames can be used to create texture image that can be rendered on the 3D render later in the process. However, key frames are not necessary for generating the 3D model.

Figure 6:
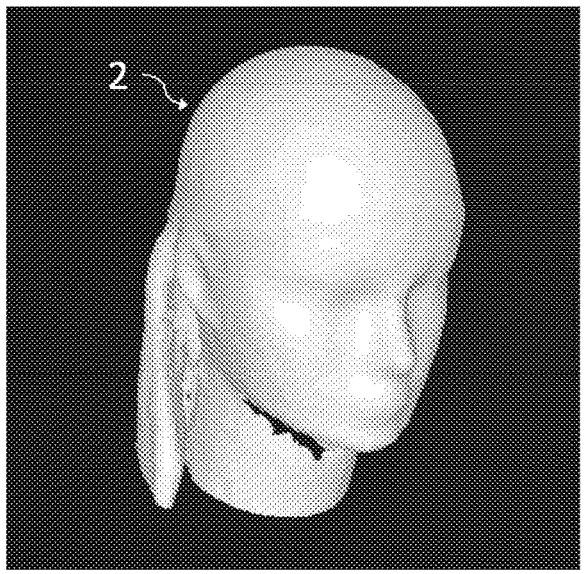
Figure 7:
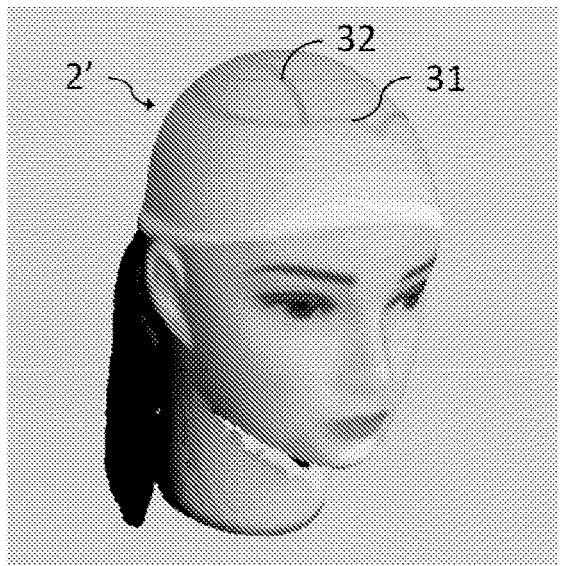

FIG. 6 and FIG. 7 are pictures illustrating an example of a 3D model generated in step S104. In FIG. 6, a 3D model 2 is presented with only geometry information, and is in the style of plaster statue. As those skilled in the art can understand, the 3D model presented with only geometry information can also be in other styles, such as 3D mesh, and the present disclosure is not limited in this respect. FIG. 7 presents a 3D model 2' with also the color information, which has been rendered on the 3D geometry. The visible indications (e.g. green lines) indicating the outline of the target and the hair part line can be seen in the 3D model 2' of FIG. 7.

In step S105, the target area to be covered by a hairpiece is identified based on the color information. The identification of the target area can be carried out by identifying the visible indication based on the color information. In the example shown in the figures, the visible indication, e.g. green line, can be identified due to its color, which is different from colors of elastic cap, hair and skin presented on the surface of the head and provides a contrast above a certain value with respect to these colors.

In some embodiments, 2D images of the 3D model containing the color information can be displayed, for example on a screen of the electronic device 20, and an operator can observe the images and identify the visible indication of the target area manually by tracing the visible indication, for example using a touch screen, a mouse and/or keyboard. As a specific example, images of the 3D model like the one of FIG. 7, which show the 3D geometry rendered with color information, can be displayed on a touch screen of the electronic device, and the operator can operate on the touch screen to rotate the 3D geometry so as to trace the outline of the target area. As another example, several 2D images showing the 3D model with color information from different angles can be displayed, the operator can trace/identify the outline in these 2D images manually and separately.

In some other embodiments, the target area can be automatically identified using an algorithm based on the color information.

In step S106, position of the target area is obtained based on the positional correspondence between the 3D geometry and the color information. More specifically, when a pixel in an image of the 3D model containing color information is identified as a point on the outline of the target area, position of this pixel/point on the 3D geometry can be determined/obtained since the 3D geometry and the color information have positional correspondence between them.

Figure 8:
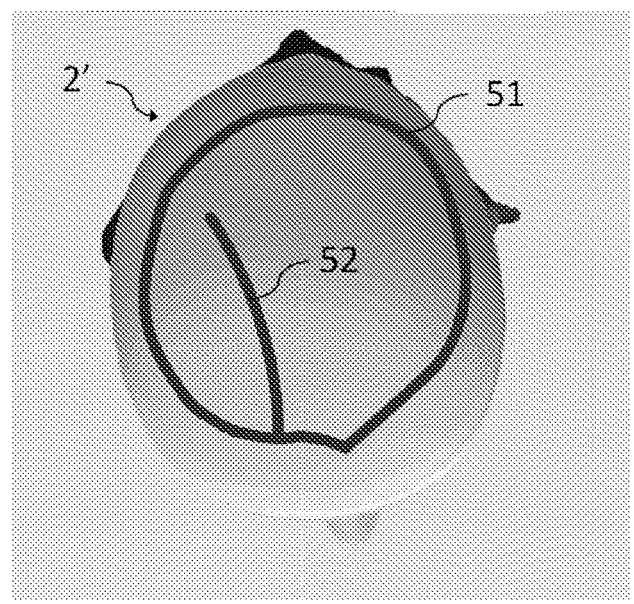
FIG. 8 is a picture showing an example of the 3D model with the outline of the target area and a hair part line indicated with lines.

In some embodiments, step S106 can be carried out in parallel with step S105. For example, when the identification of the outline of the target area is carried out by manually tracing on a 3D geometry rendered with color information presented on a screen, once a point is identified to be on the outline, position of this point on the 3D geometry can be calculated and indicated on the 3D geometry in real-time, for example with a line 51 (e.g. a red line) overlapped on the visible indication 31 (the outline of the target area), as shown in FIG. 8.

Information about position of the target area can be incorporated as part of an electronic file that specifies the 3D model, and such information can be retrieved when needed. In preferred embodiments, position of the target area can be indicated/marked on the 3D model, for example, with a line indicating the outline of the target area as shown in FIG. 8 or by rendering the target area on the 3D geometry with a color different from the color of the other area. Nevertheless, the system and the method of the present disclosure are not intended to be limited in this respect.

As shown in the figures, a desired hair part line can also be identified and position thereof can be obtained in step S105 and S106 in a similar way, and detailed description thereof is omitted here for brevity.

The method for generating a 3D digital model according to some embodiments is explained above with reference to the flow chart of FIG. 2 in an exemplary rather than in a limiting way. It is to be noted that, although steps of putting on an elastic cap on a subject's head (step S101) and marking an outline of a target area with visible indication on the cap (step S102) are preferred in most cases, the method of the present disclosure can be implemented without them. This is especially feasible when a hair loss area, as the target area, has an obvious and clean hairline, which surrounds the target area entirely. In this case, a subject's head can be 3D scanned by optical means without an elastic cap on it, and 3D model can be generated based on the scanned 3D geometry and color information. Then the target area can be identified by identifying the hairline based on color information, or by identifying the target area per se based on the difference between skin color in the hair loss area and hair color in a surrounding area.

It is also to be noted that, without steps S105 and S106, steps S101 to S104 as shown in FIG. 2 can be taken as a separated/complete method for generating a 3D digital model. The processing in steps S105 and S106 can be carried out separately, for example, by another party or operator, or in another device/system.

According to another aspect of the present disclosure, a method for creating a hairpiece manufacturing is disclosed, which comprises: generating a 3D digital model as discussed above; generating a physical mold based on the 3D digital model; and creating a hairpiece by using the physical mold.

According to another aspect of the present disclosure, a non-transitory program storage device is disclosed, which is readable by a processor and comprising instructions stored thereon to cause one or more processors to implement the method according one or more embodiments described above, alone or in any combination.

According to another aspect of the present disclosure, a device is disclosed, which comprising: a memory; a display element; and one or more processors operatively coupled to the memory and the display element and configured to execute program code stored in the memory to implement the method according one or more embodiments described above, alone or in any combination.

It should be noted that although the operation of the method is described in a particular order in the drawings, this does not require or imply that the operations must be performed in that particular order, or that all of the operations shown must be performed in order to achieve the desired result. In contrast, the steps depicted in the flowchart can change their execution order. Additionally or alternatively, certain steps can be omitted, a plurality of steps can be combined into one step, and/or a step can be decomposed into a plurality of steps.

The foregoing description is only an advantageous embodiment of the present application and a description of the technical principles of the application. It should be understood by those skilled in the art that the scope of the invention recited in this application is not limited to the technical solutions formed by the specific combination of the above-described technical features, and should also encompass other technical solutions formed by any combination of the above technical features or their equipollent features. For example, the technical solutions can be those formed through the mutual substitution between the above-mentioned features and the technical features disclosed in the present application (but not limited thereto) having similar functions.

What is claimed is:

1. A method for generating a 3D digital model used in hairpiece manufacturing, comprising:
   putting on a subject's head an elastic cap, which wraps on and conforms to the head;
   marking an outline of a target area, which is to be covered by a hairpiece with visible indication on the elastic cap;
   scanning the subject's head three-dimensionally by optical means, and obtaining 3D geometry and color information of the head, the 3D geometry and the color information having a positional correspondence therebetween;
   generating a 3D model of the head based on the 3D geometry and the color information;
   identifying the target area on the 3D model by identifying the visible indication on the elastic cap based on the color information; and
   obtaining position of the target area based on the positional correspondence between the 3D geometry and the color information.

2. The method of claim 1, wherein said identifying the target area comprises displaying images of the 3D model containing said color information and identifying the visible indication in the images manually by an operator.

3. The method of claim 1, wherein said identifying the target area comprises identifying the visible indication automatically with an algorithm.

4. The method of claim 1, wherein said scanning the head three-dimensionally comprises using infrared light to obtain 3D geometry and using visible light to obtain color information.

5. The method of claim 4, wherein infrared light is used to obtain 3D geometry by means of light coding.

6. The method of claim 4, wherein infrared light is used to obtain 3D geometry by means of ToF sensor.

7. The method of claim 4, wherein said visible indication is made by using a marker, which has a color that provides a contrast above a certain value with respect to the elastic cap, skin color and hair color.

8. The method of claim 7, wherein the marker is green or has a florescent color.

9. The method of claim 1, wherein the elastic cap is white and semi-transparent.

10. The method of claim 1, wherein the elastic cap has a thickness of no more than 0.5 mm.

11. The method of claim 1, wherein said scanning the head three-dimensionally comprises using binocular camera to obtain both 3D geometry and color information.

12. The method of claim 1, further comprising:
    marking a hair part line on the elastic cap with another visible indication;
    identifying the hair part line on the 3D model based on the color information; and
    obtaining position of the hair part line based on the positional correspondence between the 3D geometry and the color information.

13. A system for generating a 3D digital model used in hairpiece manufacturing, comprising:
    a 3D scanner, for scanning a subject's head and obtaining 3D geometry and color information of the head, the 3D geometry and color information having positional correspondence therebetween; and
    an electronic device, which receives the 3D geometry and color information, and is configured to:
    generate a 3D model of the head based on the 3D geometry and color information;
    identify a target area to be covered by a hairpiece on the 3D model based on the color information; and obtain position of the target area on the 3D model based on the positional correspondence between the 3D geometry and the color information, wherein the electronic device is configured to identify the target area by identifying a visible indication/indications provided on an elastic cap, which wraps on and conforms to the head, the visible indication marking an outline of the target area.

14. The system of claim 13, wherein the 3D scanner uses infrared light to obtain 3D geometry and visible light to obtain color information.

15. The system of claim 14, wherein the 3D scanner uses infrared light to obtain 3D geometry by means of light coding.

16. The system of claim 14, wherein the 3D scanner uses infrared light to obtain 3D geometry by means of ToF sensor.

17. The system of claim 14, wherein the electronic device is configured to display images of the 3D model containing said color information and receiving input of an operator that traces an outline of the target area, so as to identify the target area.

18. The system of claim 13, wherein the 3D scanner comprises binocular camera for obtaining both 3D geometry and color information.

19. The system of claim 13, wherein the electronic device is configured to identify the target area automatically with an algorithm.

20. The system of claim 13, wherein the electronic device is further configured to:

identify a hair part line on the head based on the color information; and obtain position of the hair part line on the 3D model based on the positional correspondence between the 3D geometry and the color information.

21. A method for generating a 3D digital model used in hairpiece manufacturing, comprising:

putting on a subject's head an elastic cap, which wraps on and conforms to the head;

marking an outline of a target area, which is to be covered by a hairpiece, with visible indication on the elastic cap;

scanning the subject's head three-dimensionally by optical means, and obtaining 3D geometry and color information of the head, the 3D geometry and the color information having a positional correspondence therebetween; and generating a 3D digital model of the head based on the 3D geometry and color information.

22. The method of claim 21, further comprising, after generating the 3D digital model:

identifying the target area on the 3D digital model by identifying the visible indication on the elastic cap based on the color information; and obtaining position of the target area based on the positional correspondence between the 3D geometry and the color information.

* * * * *